United States Patent [19]

Smith

[11] 4,005,830
[45] Feb. 1, 1977

[54] MANDRELLESS DOWNCOILER FOR COIL BOX

[75] Inventor: William Smith, Burlington, Canada

[73] Assignee: The Steel Company of Canada, Limited, Hamilton, Canada

[22] Filed: May 6, 1975

[21] Appl. No.: 574,901

[30] Foreign Application Priority Data

May 6, 1974 United Kingdom ............... 19917

[52] U.S. Cl. .......................... 242/78.1; 242/78.6; 72/146; 72/231
[51] Int. Cl.² ................. B21C 47/08; B21C 47/22
[58] Field of Search ........... 72/146, 168, 169, 183, 72/227, 231, 250; 242/78, 78.1, 78.6, 78.7, 78.8, 79–81

[56] References Cited

UNITED STATES PATENTS

| 361,591 | 4/1887 | Lenox | 72/231 |
|---|---|---|---|
| 2,653,496 | 9/1953 | Anderson | 242/78.8 |
| 2,802,586 | 8/1957 | Wingard | 242/79 |
| 3,010,672 | 11/1961 | Cecil | 242/78.8 |
| 3,226,050 | 12/1965 | Engel | 242/79 |
| 3,690,583 | 9/1972 | Herman | 242/79 |
| 3,746,229 | 7/1973 | Feller et al. | 242/78.8 |
| 3,805,570 | 4/1974 | Smith | 72/146 |
| 3,834,204 | 9/1974 | Ihle | 242/78.6 |

FOREIGN PATENTS OR APPLICATIONS

| 28,770 | 12/1965 | Japan | 72/250 |
|---|---|---|---|
| 447,018 | 5/1936 | United Kingdom | 242/78.8 |
| 988,334 | 4/1965 | United Kingdom | 242/78.8 |

Primary Examiner—C.W. Lanham
Assistant Examiner—E. M. Combs
Attorney, Agent, or Firm—Sim & McBurney

[57] ABSTRACT

This invention provides a method and apparatus for use with the rolling of hot metal strip. The first step in the rolling of hot metal strip is to roll a transfer bar of about one inch thickness, and this is ordinarily then passed through a series of finishing mills which reduce the thickness of the transfer bar to the desired final stage. The method and apparatus of this invention provides for the coiling up of a transfer bar after it has been rolled but before it passes to the finishing mill, the transfer of the coiled transfer bar from the coiling location to an adjacent uncoiling location where uncoiling can be completed or completely carried out, and initiating the coiling of a further transfer bar while the first transfer bar is still uncoiling.

16 Claims, 8 Drawing Figures

MANDRELLESS DOWNCOILER FOR COIL BOX

This invention relates generally to coilers for use with the rolling of hot metal workpieces, and has particularly to do with coiler apparatus not requiring a central mandrel.

BACKGROUND OF THIS INVENTION

The conventional method of rolling hot metal strip involves heating an ingot or slab to approximately 2300° F (for steel) and reducing it in thickness by rolling it through a series of rolling mill stands. Normally the rolling sequence takes place in two stages referred to as a roughing mill and a finishing mill.

In the roughing mill stage the slab or ingot normally is rolled through one or more rolling mill stands in a series of passes until it is reduced in thickness to a transfer bar approximately 1 inch thick. The roughing mill stage also may include one or more vertical edging mills.

Following the roughing operation, the transfer bar normally is transferred on table rolls to a continuous finishing mill train where it is further reduced to the desired gauge.

There are a number of problems inherent in this normal method of rolling hot metal strip. Some of these problems arise from the long length of time that it takes the transfer bar to feed at a relatively slow speed into the finishing mill train. In this connection, the transfer bar is fed into the finishing mill train at a speed that is slower than the speed at which the transfer bar emerges from the roughing mill. Thus, the latter speed may be 600 ft./min. and the former speed 150 ft./min. The speed of the strip emerging from the finishing mill train is much greater, of course, and may be 2800 ft./min., for example. Another problem is that to provide sufficient future capacity it is necessary to build a mill having greater capacity than that which will be utilized initially.

Because of the high heat transfer rate of the relatively thin transfer bar, the fact that heat is imparted to the transfer bar in the finishing mill, and the fact that the tail end of the transfer bar cools off as the head end thereof passes through the finishing mill train, a considerable temperature drop results between the head and tail ends of the transfer bar during the finishing mill operation. In addition, a considerable amount of secondary scale is formed on the very large exposed surface area of the transfer bar while it is waiting on the delay table ahead of the finishing mill stage. It will be understood that the aforesaid temperature differential creates a problem in that temperature is an important factor in the rolling operation, and changes in temperature must be compensated for if constant strip thickness is to be achieved. Moreover, in order to obtain constant metallurgical properties, strip temperature out of the last finishing mill stand must be kept substantially constant.

In order to overcome the temperature differential problem, modern mills are powered to roll the transfer bar at its its minimum tail end temperature, are designed for high speed operation to minimize the time that the transfer bar sits on the delay table and are equipped to provide zoom rolling in order to maintain an acceptable constant strip temperature out of the last finishing mill stand. Zoom rolling involves accelerating the finishing mill after the head end of strip has reached the coilers to compensate for the temperature differential by increasing the amount of heat put into the transfer bar during the finishing mill operaton. Zoom rolling also decreases the time that the transfer bar sits on the transfer table. Where zoom rolling is used, zoom cooling also is required.

In order to remove secondary scale formed on the transfer bar while it is waiting on the delay table, a high pressure water descaling unit is employed, this unit being located just ahead of the finishing mill train. Of course, such treatment drastically reduces the temperature of the transfer bar, and additional mill rolling horsepower is required to compensate for this reduction in temperature.

It is known to provide a heat reflector shield over the delay table to reduce the heat radiation loss from the top side of the transfer bar. However, this system only partially conserves the heat of the transfer bar, does not eliminate head to tail rundown or equalize transfer bar temperature and does not prevent formation of secondary scale.

It also is known to roll a tapered transfer bar with its head end thinner than its tail end. The theory of this system is, of course, that the thicker tail end of the transfer bar will lose heat more slowly than the front end thereof and, consequently, reach the first finishing stand at a similar temperature to that of the head end when it was at the entry to the first finishing stand. This technique introduces additional operating variables, e.g., taper rolling in the roughing stands and variable drafting through the finishing stands. It also doesn't prevent formation of secondary scale.

The installation at the delay table of an induction heating furnace to control the temperature of the transfer bar has been suggested. However, this technique could interfere seriously with the removal of cobbles.

The use of a Steckel mill to avoid the aforesaid head to tail temperature differential and its associated problems also is known. A Steckel mill is designed primarily for the purpose of rolling light gauge strip on a single stand reversing hot mill. Normally there is provided a reversing roughing stand that reduces a slab to about 1 inch before presenting it to a single stand, reversing, four high roll stand with a hot coiling furnace located on either side thereof. The transfer bar is passed back and forth through the latter stand until the desired thickness is obtained, the strip being successively reheated in the coiling furnaces on the final passes. This method suffers from the following drawbacks:

a. poor strip surface quality resulting from the formation of scale during the rolling and reheating cycles, this scale being rolled into the strip, b. fast deterioration of mill work rolls caused by rolled in scale and all work being done on one set of mill rolls, and c. variation in gauge due to the ends of the strip being colder than the middle of the strip because of the relatively cool temperature of the mandrels and the length of time that the ends of the strip are out of the hot coiling furnaces during the reversing cycle.

In copending British Complete Application Ser. No. 52995/1971 filed Nov. 15, 1972 and based on a British Provisional filed Nov. 15, 1971, there is described, inter alia, a mandrelless downcoiler intended to be inserted in a rolling mill subsequent to the rolling of the transfer bar and prior to the entry of the transfer bar into the finishing mill train. Essentially, the mandrelless coiler construction disclosed in the aforementioned British Application Serial No. 52995/1971 includes nip rollers for positively feeding the transfer bar toward a set of bending rolls which are positively driven at the same speed as the pinch rolls and which give to the transfer bar a continuous bend or curve. The leading curl on the transfer bar which results from the bending rolls settles against suitable support rollers and constitutes the inside convolution about which the remainder of the transfer bar automatically coils itself. When the tail end has passed the location of the bending rolls, the support rollers on which the coil rests are braked to a stop, while at the same time the tail end of the transfer bar "flops down" against additional aligned rollers, pointing in the same direction as the initial direction of movement of the transfer bar prior to entry into the mandrelless coiler. The support rollers under the coil are then driven in the reverse direction, and the new leading end (previously the tail end) of the coil is fed along a continuing bed of rollers to enter the finishing mill train.

The foregoing mandrelless downcoiler construction offers a number of advantages, among which are: reducing the length of the mill, buildings, foundations, etc. that would otherwise be required; increasing the capacity of an existing mill to roll larger size coils than it was designed to roll; conservation of the heat of the hot metal workpiece; substantial equalization of the temperature of the hot metal workpiece; reduction of the formation of secondary scale on the hot metal workpiece; and reduction in the cost of mill drives, electric motors, power supplies, controls and other electrical equipment.

While there is no question that the foregoing mandrelless downcoiler construction described and clearly set forth in British Complete Application No. 52995/1971 presents an improvement over the prior art techniques and apparatus described earlier in this specification, there is nonetheless some room for further improvement, particularly relating to the most efficient use of the mandrelless downcoiler principle.

GENERAL DESCRIPTION OF THIS INVENTION

Accordingly, it is an aspect of this invention to improve and render more efficient the use of the basic mandrelless downcoiler principle as employed in a rolling mill, so as to permit, essentially, a substantially uninterrupted feed of coiled transfer bars into the finishing mill train. It will be appreciated that, with the construction set forth above and more clearly set out in British Patent Application No. 52995/1971, there is a time-lapse between the passage of each coiled transfer bar through the finishing mill train, the time lapse representing the length of time necessary to coil each transfer bar in the mandrelless downcoiler.

This invention therefore provides, in a method of rolling hot metal strip, the steps of: rolling a transfer bar, coiling the tranfer bar at a coiling location to form a coil having an open center core, initiating the uncoiling of said coil and passing the uncoiling transfer bar toward a finishing operation, transferring the coil from said coiling location to an uncoiling location, and, during at least part of the uncoiling step, coiling a further transfer bar at said coiling location to form a further coil having an open center core.

This invention also provides, in combination, means for coiling a transfer bar at a coiling location to form a coil having an open center core, means for transferring said coil from said coiling location to an adjacent uncoiling location, and means for uncoiling said coil.

GENERAL DESCRIPTION OF THE DRAWINGS

One embodiment of this invention is illustrated in the accompanying drawings, in which like numerals denote like parts throughout the several views, and in which.

PARTICULAR DESCRIPTION OF THE DRAWINGS

Figure 4:
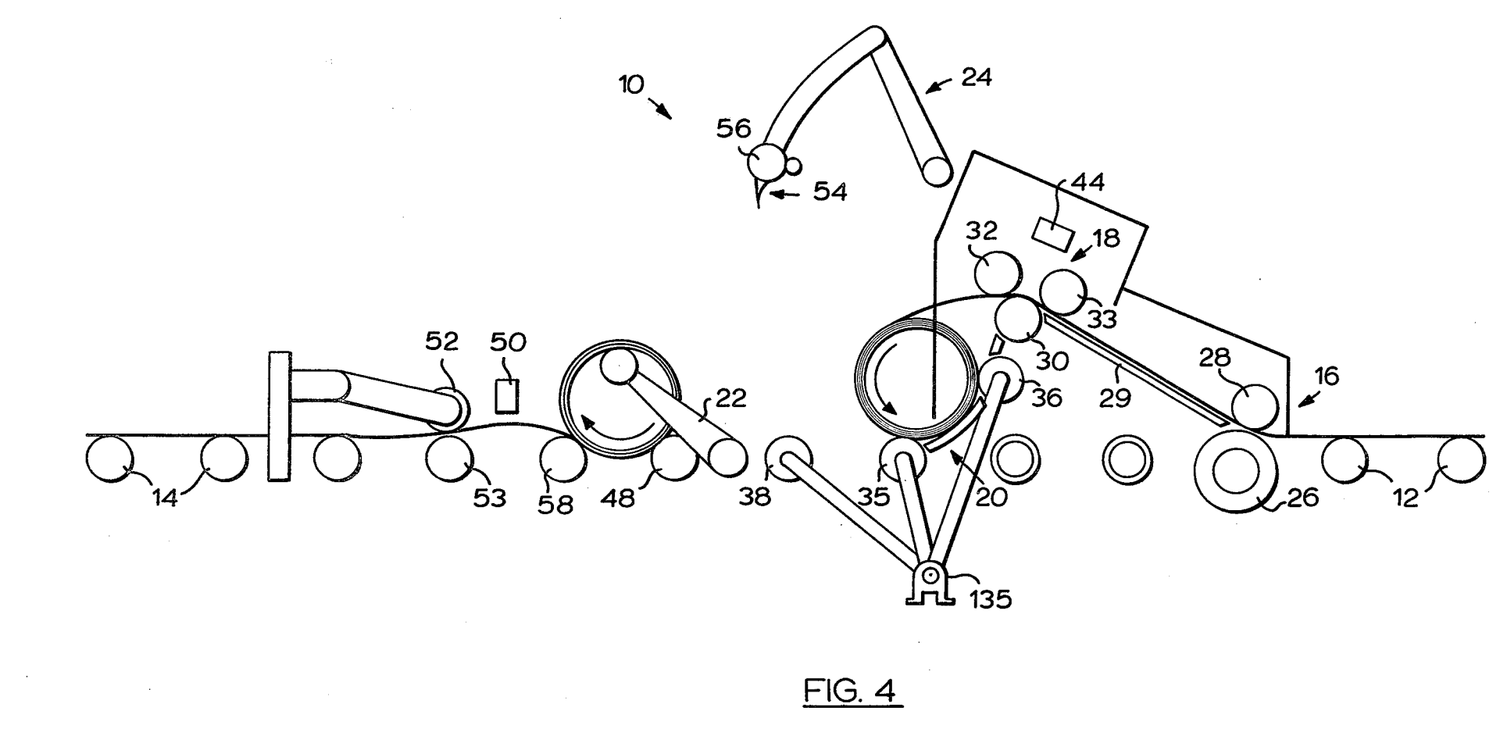

Attention is first directed to FIG. 4, with the help of which the general layout of the different components of the apparatus of this invention will be described. As seen in FIG. 4, a mandrelless downcoiler assembly 10 is located between a plurality of freely turning table rolls 12 on the right and a plurality of freely turning table rolls 14 on the left. In FIG. 4, the general direction of movement of the hot workpieces is from right to left. The two table rolls 12 appearing in FIG. 4 are located at the downstream end of a large number of such rolls extending further to the right, while the table rolls 14 are located at the upstream end of another plurality of such rolls extending to the left from the view in FIG. 4. Essentially, the transfer bars are brought from right to left on the table rolls 12, are fed through and coiled in the mandrelless downcoiler 10, and then are uncoiled from the mandrelless down coiler in the leftward direction supported by table rolls 14.

The mandrelless downcoiler assembly 10 is seen to include an entry pinch roll set 16, a set 18 of bending rolls, a set 20 of coil cradle rolls, a pair of transfer arms 22 mounted for pivotal movement later to be described, and a peeler arm 24.

The set 16 of entry pinch rolls includes a lower roll 26 and an upper roll 28. The upper roll is vertically adjustable, and is raised away from the lower roll 26 to permit the leading end of a transfer bar to pass into the pinch between the rolls 26 and 28. Then, the upper roll 28 moves toward the lower roll 26, pinches and grips the leading end of the transfer bar, and positively drives the same upwardly along a deflection plate 29 toward the set 18 of bending rolls. The set 18 of bending rolls is conventional in nature and consists of one lower roll 30 and two upper rolls 32 and 33, both of which are positively driven. The upper rolls 32 and 33 are vertically adjustable so as to be able to set the degree of curl or bend in the transfer bar as the same passes between the bending rolls as drawn in FIG. 4. Also, since the required degree of curl in the transfer bar as the coiling progesses is less and less, the usual procedure is to lift the upper driven rolls 32 and 33 gradually during the coiling, until the point is reached where they do not exert any appreciable bending force against the upper surface of the transfer bar.

As is seen in FIG. 4, the first few convolutions of the coil formed by the transfer bar rest against cradle rolls 35 and 36 initially, these latter two rolls forming part of the coil cradle roll set 20. It is to be understood that the set 20 of coil cradle rolls functions to support the coil only during the coiling step, and not during the uncoiling step. A third cradle roll 38 also forms part of the set 20, and it can be seen in FIG. 5 that when the coil 40 reaches a certain size it transfers leftwardly under its own weight to rest upon and be supported by the rolls 35 and 38.

Figure 5:
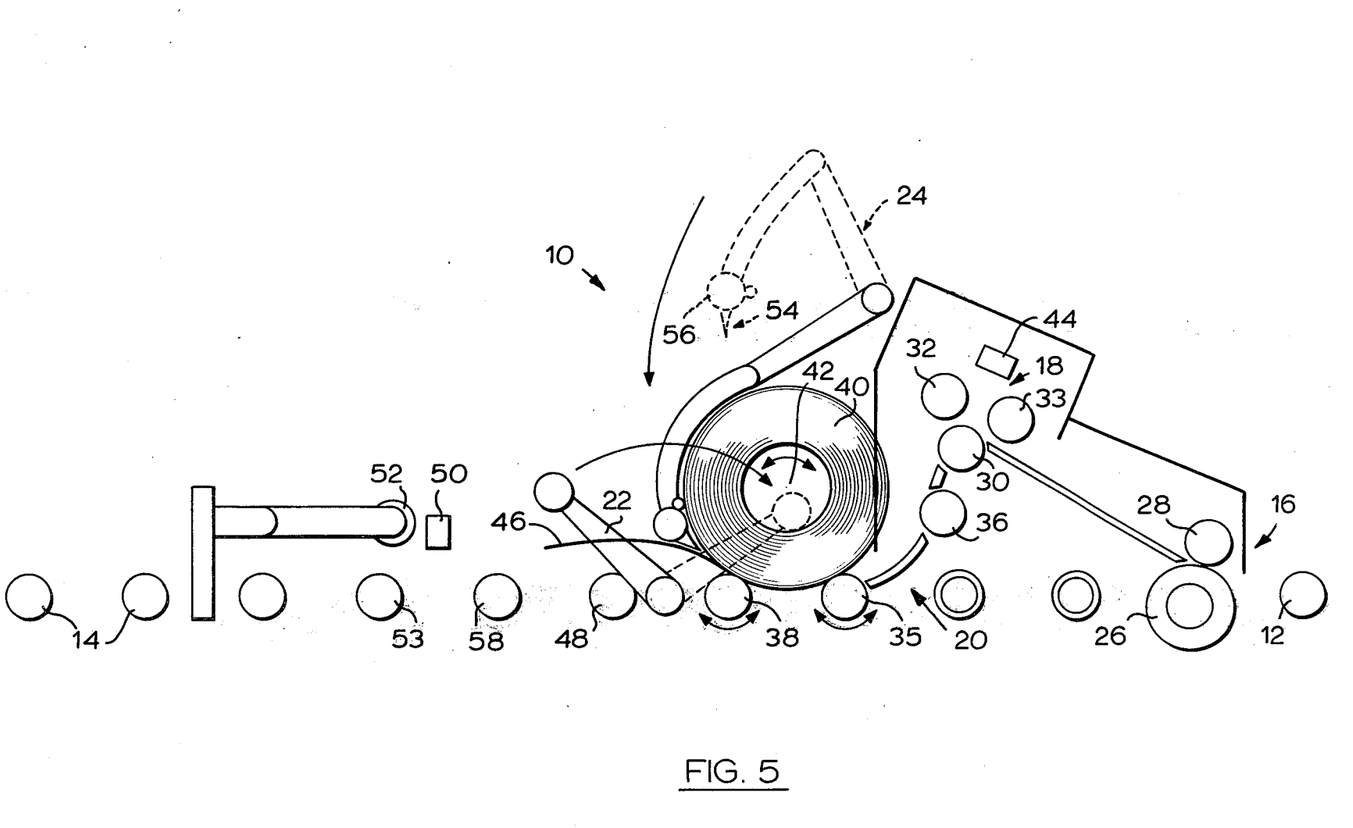

It has been found necessary to positively drive the cradle rolls 35, 36 and 38 of the set 20 in order to promote the initial coiling of the transfer bar and to continue proper coiling when the coil 40 has shifted to the location shown in FIG. 5. Some speed adjustability in the rolls 35, 36 and/or 38 is required in order to finely adjust the size and tightness of the coil 40, and in order to compensate for the gradually increasing outer diameter of the coil 40 during the coiling procedure. The size of the coil "eye" 42 is controlled by the relative position of the bending rolls 30, 32 and 33. An entry hot metal detector 44 is located above and adjacent the set 18 of bending rolls, and is adapted to sense the point at which the trailing end of a transfer bar passes through the set 18 of bending rolls. The signal thus generated initiates the braking of the cradle rolls 35 and 38, thus bringing the counter-clockwise rotation of the coil 40 to a halt at a point in time which is subsequent to the passage of the trailing end through the set 18 of bending rolls but before the trailing end (shown at 46 in FIG. 5) moves around as far as the cradle roll 38. The natural "swing" tendency for the trailing end 46 of the transfer bar will carry it in the counter-clockwise direction and tend to make it lay flat against table roll 48, pointing in the leftward direction. In FIG. 5 the trailing end 46 is shown at a point where it has almost dropped down against the table roll 48. At about the time when the cradle rolls 35 and 38 are brought to a halt, which point in time would also ordinarily find the trailing end 46 in the position shown in FIG. 5, the peeler arm 24 begins its downward movement from the solid line position in FIG. 4 to the solid line position of FIG. 5.

The cradle rolls 35 and 38 are not allowed to stand still for any appreciable length of time, in order to avoid the formation of "cold spots" in the coil 40. Instead, they are immediately reversed in direction, thus urging the coil 40 to rotate in the clockwise direction as seen in FIG. 5, and also pushing the end 46 (previously the trailing end but now the leading end) in the leftward direction beneath an exit hot metal detector 50 and between an exit pinch roll 52 and a table roll 53 with which the exit pinch roll 52 is adapted to cooperate, as later described.

The peeler arm 24 is shown schematically only in FIGS. 3 – 7, and its specific structure will be discussed subsequently with reference to FIG. 1. For the moment, it is sufficient to point out that the peeler arm includes a knife-edge means 54 which is adapted to insert itself between the tail end 46 and the next adjacent convolution of the coil 40, should it happen that, for some reason, the tail end 46 becomes stuck or adhered to the next inner convolution. The peeler arm 24 also includes a flattening roll 56, which is free-turning, and which is intended to urge the now unwinding end 46 downwardly against the table roll 48 and the subsequent rolls to the left in order to control its passage towards the finishing stands.

There are two transfer arms 22 provided, but these remain aligned in all of the views 1, 3–7. The transfer arms are provided with stub mandrels (later to be described in detail) which are adapted to be inserted into the eye 42 of the coil 40 when the transfer arms 22 have moved to the solid-line position of FIG. 6, following which the transfer arms 22 are rotated in the counter-clockwise direction as shown by the solid arrow in FIG. 6, to arrive at the broken-line position of FIG. 6. In so doing, the transfer arms pick up the coil 40, which is in the process of uncoiling, and set it down to rest on roll 48 and a second roll 58. The rolls 48 and 58 together define the uncoiling location, while the rolls 35 and 38 define the coiling location. Prior to the counter-clockwise swinging of the transfer arms 22, the peeler arm 24 is retracted out of the way, to the solid-line position shown in FIG. 6.

Figure 6:
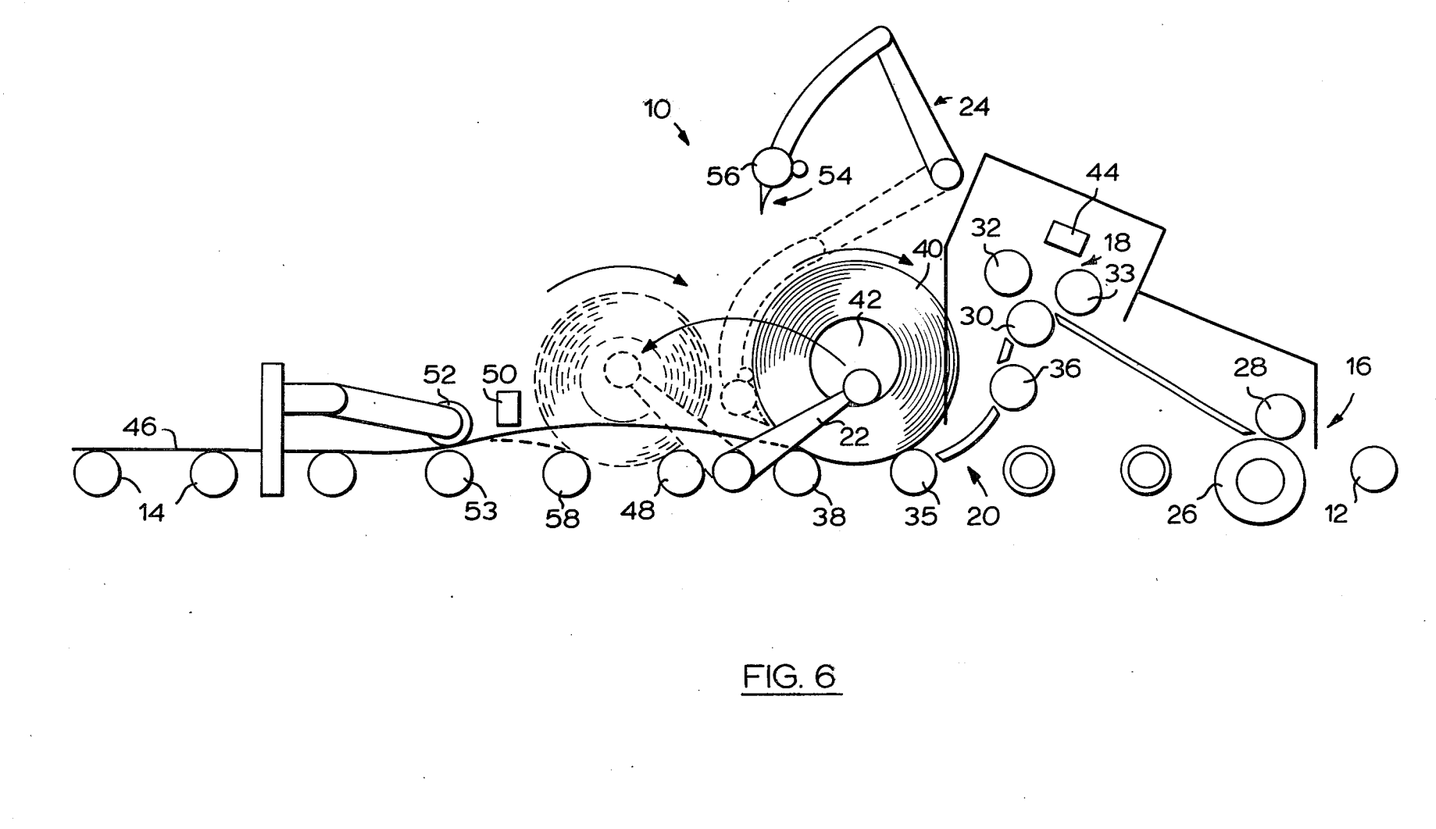

FIG. 6 also shows that the exit pinch roll 52 has come down against the table roll 53 to grip and positively urge leftwardly the free end of the transfer bar forming the coil 40. Thus, the end which constituted the trailing end to the right of the apparatus 10, constitutes the leading end to the left of the apparatus 10. It will be understood that, at any time after the transfer of the coil 40 from the coiling location to the uncoiling location by the transfer arms 22, a new transfer bar can begin to coil against the rolls 36 and 35. However, because the uncoiling of the coil takes longer than the coiling of a transfer bar, and because it is undesirable to have a completed coil waiting at the coiling location for an appreciable length of time before beginning to uncoil, it has been found to be best to start coiling a new transfer bar only after the previous coiled transfer bar is about 75% uncoiled. This ensures that, by the time the next transfer bar been fully coiled, the previous transfer bar coil is fully uncoiled and the uncoiling location is free.

Figure 7:
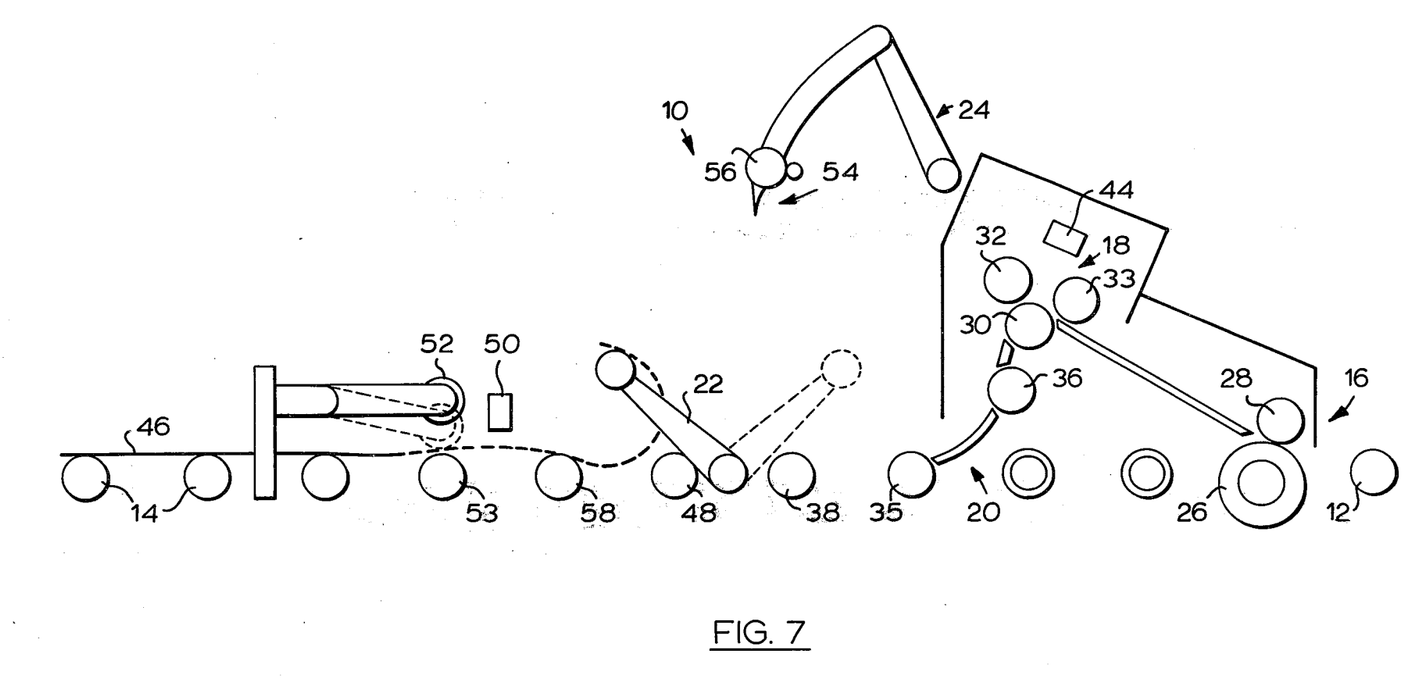

FIG. 7 shows the transfer arms 22 still in their leftward location when the inside convolution of the uncoiling coil is leaving the apparatus 10. This provision ensures that the tightly curled inside convolution is completely uncoiled before leaving the uncoiling location.

It will be understood that, in the situation illustrated in FIG. 7, there would ordinarily be a new transfer bar already coiling against the set of coil cradle rolls defining the coiling location. FIG. 4 shows this simultaneous coiling and uncoiling taking place.

Figure 1:
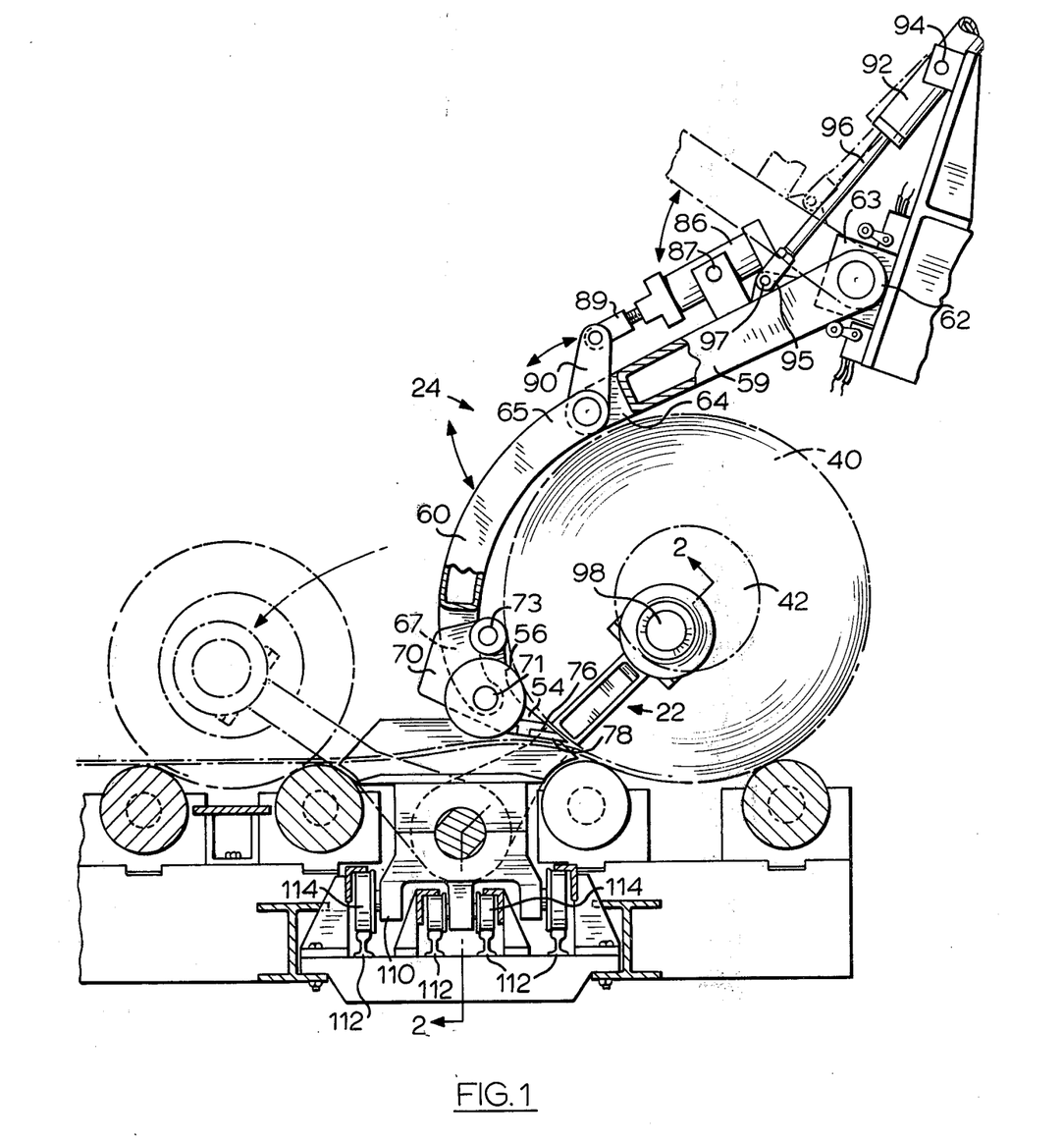
FIG. 1 is a side elevation, partly in section, of a mandrelless downcoiler constructed in accordance with this invention.
Figures 2, 2A:
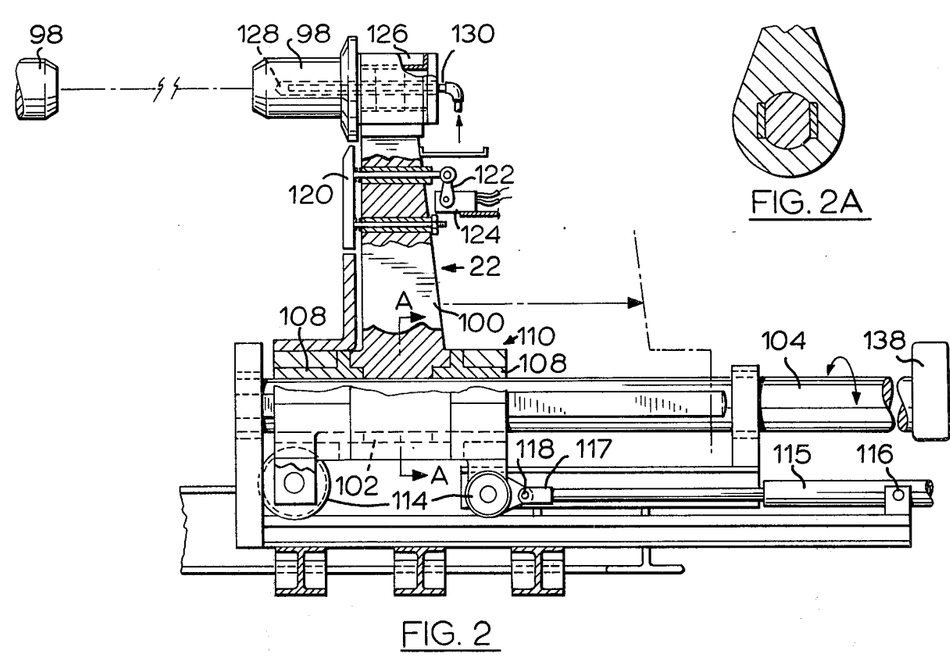
FIG. 2 is an end view, partly in section, of one porton of the apparatus of FIG. 1.
FIG. 2A is a sectional view taken at A—A in FIG. 2.
Figure 3:
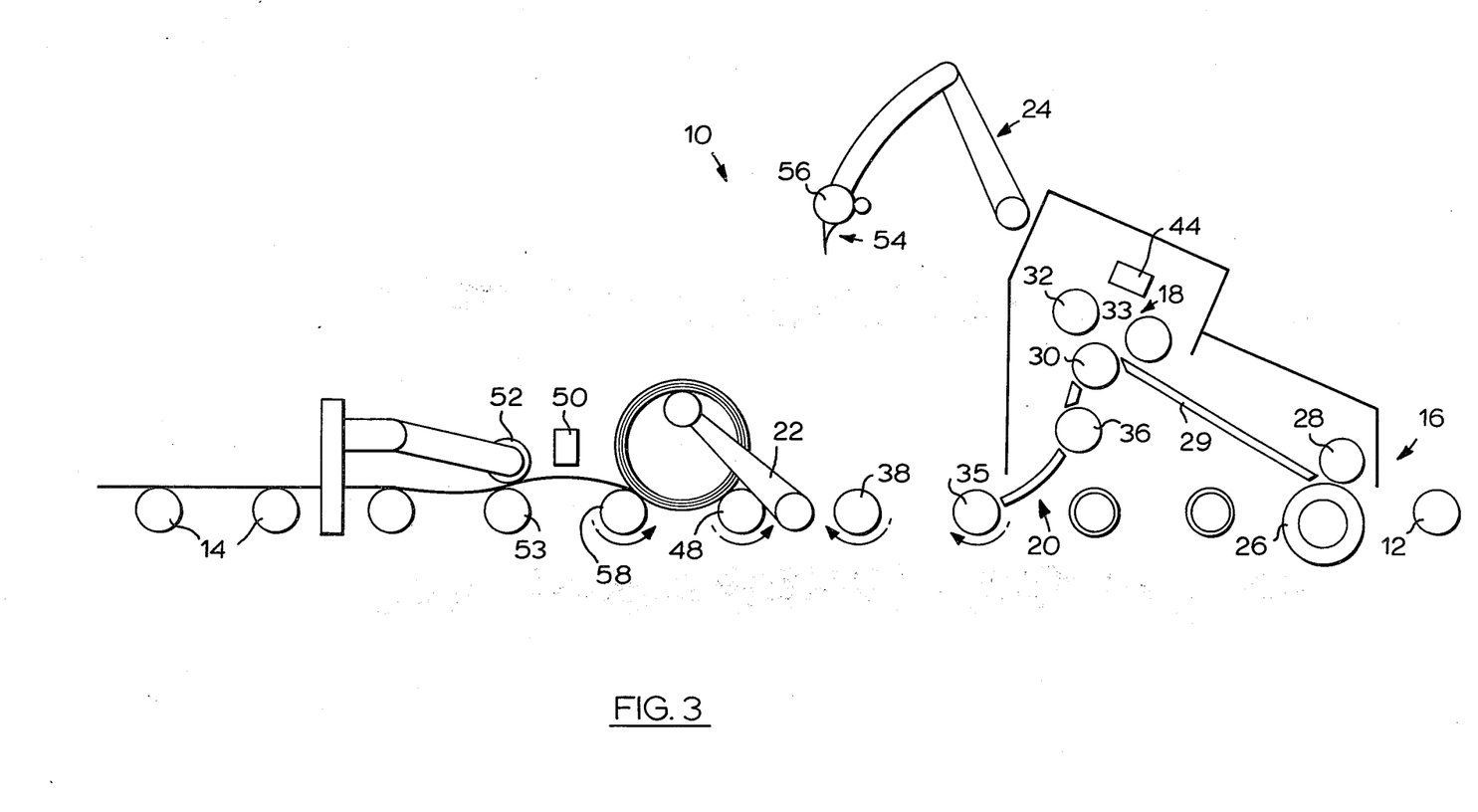
FIGS. 3 – 7 inclusive are schematic elevational views of the apparatus of this invention at five different points in the operation thereof.

Attention is now directed to FIGS. 1 and 2, with the help of which one particular construction of the peeler arm and transfer arms will be described.

In FIGS. 1 and 2, the structural components relating specifically to the peeler arm 24 and to the transfer arms 22 are illustrated in somewhat greater detail than in the remaining figures. Turning first to the peeler arm 24, it will be noted that this includes an upper arm member 59 and a forearm member 60. The upper arm member has one end 62 pivoted to a portion 63 of the frame of the mandrelless coiler housing, while the other end 64 thereof is articulably connected to one end 65 of the forearm member 60. At the other end 67 of the forearm member 60 are located the knife-edge means 54 and the flattening roll 56. As particularly seen in FIG. 1, a rocker member 70 is pivotally connected to the lower end 67 of the forearm member 60 by means of a pivot pin member 71. The rocker member 70 supports a freely-rotating tracer roll 73 and incorporates the knife-edge means 54. The flattening roll 56 is also mounted for free rotation about the pivot pin member 71, and is able to rotate entirely independently of the rocker member 70.

The knife-edge means 54 can be seen to include a supporting member 76 fixed with respect to the rocker member 70, and an edge member 78 fixed with respect to the supporting member 76. The edge member 78 defines an acute knife-edge adapted to lie immediately adjacent but spaced slightly from the outer surface of the coil 40 when the peeler arm 24 is in the position shown in solid lines in FIG. 1.

The articulation between the upper arm member 59 and the forearm member 60 is controlled by means of a hydraulic cylinder 86 which is pivoted at 87 with respect to the upper arm member 59, and which has the remote end 89 of the moveable piston pivoted to an extension member 90 which is fixed with respect to the forearm member 60. Thus, extension of the hydraulic cylinder 86 causes the forearm member 60 to rotate in the counter-clockwise direction with respect to the upper arm member 59, whereas retraction of the hydraulic cylinder 86 causes clockwise motion of the forearm member 60 with respect to the upper arm member 59.

A further hydraulic cylinder 92 is pivoted to the portion 63 of the frame at the pivot 94, and the remote end 95 of the piston 96 of the hydraulic cylinder 92 is pivoted at the point 97 which is fixed with respect to the upper arm member 59. Thus, extension of the hydraulic cylinder 92 causes the upper arm member 59 to rotate in the counter-clockwise direction with respect to the portion 63 of the frame, whereas retraction of the hydraulic cylinder 92 causes the upper arm member 59 to rotate in the clockwise sense with respect to the portion 63 of the frame.

It will be noted that the forearm member 60 is curved to approximately match the maximum outer curvature of the coil 40.

When the peeler arm 24 is in its upper, retracted position, as shown and in solid lines in FIG. 4, the rocker member 70 at the lower end of the forearm member 60 assumes the orientation illustrated in that figure, in which the knife-edge 80 extends downwardly and slightly leftwardly, and in which the tracer roll 73 is at a position in which it is the first portion to contact the coil 40 upon descent of the peeler arm 24. Upon descent of the peeler arm 24, the initial contact between the tracer roll 73 and the outer surface of the coil 40 will cause the rocker member 70 to rotate in the counter-clockwise sense to bring the knife-edge adjacent but slightly spaced from the outer surface of the coil 40 due to the geometry of the tracer roll 73 and the flattening roll 56 which is also now in contact with the coil 40. Further descending movement of the peeler arm 24 causes the tracer roll 73 and flattening roll 56 to roll downwardly in the counter-clockwise direction around the surface of the coil 40, and causes the knife-edge to move along but out of contact with the outer surface of the coil 40 ahead of the tracer roll 73 until its extreme position of descent is reached. At this stage the piston in the hydraulic cylinder 86 is retracted approximately 1 inch, which in turn moves the peeler arm 24 in a clockwise direction. This moves the peeler blade out of contact with the coil 40 by approximately 3 inches. Engagement between the peeler blade and any part of the coil 40 is undesirable. What is preferred is that the unwinding portion of the transfer bar from the coil 40 contact only the flattening roll 56.

Attention is now directed to both FIGS. 1 and 2 for a more detailed description of the transfer arms 22. FIG. 2 shows one of the transfer arms 22, but it is to be understood that the other of the pair of transfer arms is identical to that shown in FIG. 2, but reversed in the mirror-image sense. The view of the transfer arm 22 seen in FIG. 1 is a view looking into the stub mandrel 98 of the more remote of the two transfer arms 22 in FIG. 1. In other words, the FIG. 1 view is an elevation of the transfer arm of FIG. 2 as if seen looking rightwardly from a position to the left of its stub mandrel 98. As best seen in FIG. 2, the transfer arm 22 includes an elongated portion 100 which is intregral at the lower or inner end with a cylindrical member 102 which in turn is keyed to a rotatable shaft 104 which extends all of the way beneath the coil 40 and is common to the two transfer arms 22. Rotation of the shaft 104 is accomplished by a drive means (not shown), which may be a rotary hydraulic drive cylinder of known type and construction. As particularly seen in FIG. 2, structural support portions 108 define bearings with respect to which the cylindrical member 102 and the elongated portion 100 of the transfer arm 22 are rotatable. The structural support portions 108 are part of a moveable carriage 110 which is adapted to reciprocate in the direction of the axis of the coil 40 along rails 112. Flanged wheels 114 are journalled for free rotation with respect to the carriage 110 and are adapted to roll the carriage leftwardly and rightwardly in FIG. 2. Positive movement of the carriage 110 along the rails 112 is accomplished by means of a hydraulic cylinder 115 which is fixed to the floor or the basic frame of the coiler at a pivot point 116, and which has the remote end 117 of its piston pivotally connected at 118 to a portion of the carriage 110.

Mounted on the elongated portion 100 of the transfer arm 22 at a point intermediate the cylindrical member 102 and the stub mandrel 98 is a sensing bar 120 which is adapted to come into contact with the coil 40 upon leftward movement of the transfer arm 22 (as seen in FIG. 2), and to register such contact by pushing rightwardly on a signal arm 122 of a relay 124, thus instructing the hydraulic cylinder 115 to halt its extension and to retract about 2 inches in order to leave some clearance between the transfer arm 22 and the edge of the coil 40. Naturally, both transfer arms would operate in tandem, and both cylinders would simuntaneously retract their respective transfer arms the same distance.

As seen in FIG. 1, the position of the transfer arm 22 when it is being moved toward the coil 40 to insert the stub mandrel 98 into the eye 42 of the coil 40 is such that the mandrel 98 does not contact any part of the coil 40, but rather passes directly into the eye 42.

As can be seen in FIG. 2, the stub mandrel 98 is journalled in a cylindrical bearing member 126 supported at the end of the elongated portion 100 remote from the cylindrical member 102. A blind borehole 128 is provided in the stub mandrel 98, the blind end being within the mandrel portion itself. A cooling water delivery pipe 130 is fixed such that it extends from the open end of the borehole 128 to a point closely adjacent the blind end of the borehole, in spaced relation at all points to the borehole. Cooling water is forced under pressure through the pipe 130, and simply exits at the open end of the borehole 128 around the pipe 130.

In FIG. 4, means 135 has been illustrated for positively rotating to the cradle rolls 35, 36 and 38. The means 135 may be an electric motor, hydraulic means, or any other suitable component.

In FIG. 2, a hydraulic component 138 has been illustrated, which provides the motive power to rotate the shaft 104 in either direction, in order to swing the transfer arms 22 between the two positions illustrated in broken lines and solid lines, respectively, in FIG. 5. The component 138 may be electrical, mechanical, or of any other alternative form, and is merely shown schematically.

What I claim is:

1. In combination:
    coiling means for a transfer bar, including bend rollers adapted to curl the transfer bar and first cradle rolls on which the transfer bar can be supported as it coils itself into a coil with an open center core,
    second cradle rolls adjacent the first cradle rolls, the second rolls being adapted to receive a coil for uncoiling,
    and transfer means for transferring a coil from said first cradle rolls to said second cradle rolls, said transfer means including a pair of spaced-apart transfer arms coaxially pivoted at a position between the first cradle rolls and the second cradle rolls, each transfer arm having a stub mandrel and being movable toward and away from the other transfer arm, the stub mandrels being adapted to enter the open center core of a coil from opposite sides, and means for pivoting the transfer arms in tandem to swing the coil from said first cradle rolls to said second cradle rolls.

2. The combination claimed in claim 1, in which there are three first cradle rolls, two of which have their axes aligned in a common horizontal plane, the last of which has its axis parallel with the others but raised above them.

3. The combination claimed in claim 2, in which said two aligned cradle rolls include means for positively rotating them in either direction.

4. The combination claimed in claim 3, in which said last of said first cradle rolls has means for rotating it at least in the direction for coiling the transfer bar.

5. The combination claimed in claim 1, in which the coiling means includes a sloping deflection plate adapted to receive a transfer bar travelling in a horizontal plane and to deflect the same obliquely upward in its direction of travel, pinch rolls at the upstream end of the deflection plate adapted to grip and advance the transfer bar, said bend rollers including three bend rollers located at the downstream end of said deflection plate and arranged to receive a transfer bar such that two bend rollers are above and one bend roller is below the transfer bar, whereby the transfer bar can be given a forward and downward curl as it advances through the bend rollers, said two of said first cradle rolls being below the bend rollers and displaced therefrom in the direction of transfer bar travel, said last of said first cradle rolls being located generally between said bend rolls and the upstream one of said two first cradle rolls, said last cradle roll having means for rotating it in the direction to coil up the transfer bar, said two of said cradle rolls having means for rotating them selectively in either direction.

6. The combination claimed in claim 5, in which said transfer means includes a pair of spaced apart transfer arms coaxially pivoted at a position between the first cradle rolls and the second cradle rolls, the transfer arms being slidable toward and away from each other in a direction transverse to that of transfer bar travel, each transfer arm having a stub mandrel adapted to enter the open center core of a coil from its respective side, and means for positively pivoting the transfer arms in tandem between a first position in which the stub mandrels engage a coil resting on said first cradle rolls, and a second position in which the stub mandrels engage a coil resting on said second cradle rolls.

7. The combination claimed in claim 6, in which there are two of said second cradle rolls.

8. The combination claimed in claim 6, in which a further pinch roll set is provided downstream of said second cradle rolls, for positively gripping and advancing a transfer bar in the process of uncoiling.

9. The combination claimed in claim 1, which further includes means for inserting a flattening roll between the last-to-be-coiled end of a coiled transfer bar and the next inward convolution thereof, thereby to urge said last-to-be-coiled end to flatten out at the initiation of uncoiling.

10. The combination claimed in claim 6, further including arm means for inserting a flattening roll between the last-to-be-coiled end of a coiled transfer bar and the next inward convolution thereof, thereby to urge said last-to-be-coiled end to flatten out at the initiation of uncoiling.

11. The combination claimed in claim 10, in which said arm means carries, in addition to the flattening roll, knife-edge means and a freely rotating tracer roll, all arranged such that when the flattening roll and the tracer roll are in contact with the outside convolution of a coiled transfer bar, the knife-edge means is located immediately adjacent but spaced slightly from the coil, and pointing in the direction opposite the uncoiling direction.

12. The combination claimed in claim 11, in which the tracer roll and the knife-edge means are both mounted on a rocker member pivoted to the arm means at the axis of the flattening roll.

13. The combination claimed in claim 12, in which the arm means includes an upper arm member having one end pivoted to a frame portion which is fixed with respect to the axis of the cradle rolls, and a forearm member having one end pivoted to the other end of the upper arm member, the forearm member supporting at its other end the flattening roll and said rocker member.

14. In combination:
    coiling means for a transfer bar, including bend rollers adapted to curl the transfer bar and cradle rolls on which the transfer bar can be supported as it coils itself into a coil with an open center core,
    a flattening roll,
    and means for inserting the flattening roll between the last-to-be-coiled end of a coiled transfer bar and the next inward convolution thereof, thereby to urge said last-to-be-coiled end to flatten out at the initiation of uncoiling, said means for inserting the flattening roll including an arm articulable between an extended position and a withdrawn position, the arm carrying, in addition to the flattening roll, knife-edge means extending in one direction from the flattening roll and a freely rotating tracer roll extending in the opposite direction from the flattening roll, all arranged such that when a flattening roll and a tracer roll are both in contact with the outside convolution of a coiled transfer bar, the knife-edge means is cantilevered so as to be adjacent but spaced slightly from the coil, and pointing in the direction opposite the uncoiling direction.

15. The combination claimed in claim 14, in which the tracer roll and the knife-edge means are both mounted on a rocker member pivoted to the arm means at the axis of flattening roll.

16. The combination claimed in claim 15, in which the arm means includes an upper arm member having one end pivoted to a frame portion which is fixed with respect to the axis of the cradle rolls, and a forearm member having one end pivoted to the other end of the upper arm member, the forearm member supporting at its other end the flattening roll and said rocker member.

* * * * *